US006902436B2

(12) United States Patent
Liao

(10) Patent No.: US 6,902,436 B2
(45) Date of Patent: Jun. 7, 2005

(54) CAR LIGHTER PLUG OF QUICK DISASSEMBLY

(76) Inventor: Sheng Hsin Liao, No. 10, Alley 38, Lane 229, San Chun St, Shulin City, Taipei Hsien (TW)

(*) Notice: Subject to any disclaimer, the term of this patent is extended or adjusted under 35 U.S.C. 154(b) by 514 days.

(21) Appl. No.: 10/194,062

(22) Filed: Jul. 15, 2002

(65) Prior Publication Data

US 2004/0007915 A1 Jan. 15, 2004

(51) Int. Cl.$^{7}$ .................................................. H04N 1/00
(52) U.S. Cl. ......................................... 439/668; 403/91
(58) Field of Search ................................ 439/668, 669; 379/446, 454; 403/91, 101

(56) References Cited

U.S. PATENT DOCUMENTS 5,414,770 A * 5/1995 Wang ......................... 379/446
5,860,824 A * 1/1999 Fan ............................ 439/265
6,317,497 B1 * 11/2001 Ou ............................. 379/454
6,366,672 B1 * 4/2002 Tsay ........................... 379/446
6,616,470 B2 * 9/2003 Lu et al. ..................... 439/265
6,848,344 B2 * 2/2005 Rocco ....................... 81/177.8

* cited by examiner

*Primary Examiner*—Neil Abrams
(74) *Attorney, Agent, or Firm*—Browdy and Neimark, P.L.L.C.

(57) ABSTRACT

A car lighter plug of quick disassembly includes a first body, a second body, a pivot, and a first quick-disassembly twist button. The first body has an elastic conducting post and several elastic conducting sheets. The rear end of the first body has a through hole. Several elastic sheet portions, each having a positioning body, are formed in the through hole. The periphery of the elastic sheet portions has a vacant space. The front end of the second body has a second pivotal seat. The pivot has a pivotal portion, positioning teeth, and a stop ring. The pivotal portion passes through the through hole and the pivotal seat. One end of the first quick-disassembly twist button has a cam portion. The first quick-disassembly twist button is pivotally connected at one end of the first pivot. The cam portion abuts against the first body. The positioning teeth engage the positioning bodies.

7 Claims, 6 Drawing Sheets

CAR LIGHTER PLUG OF QUICK DISASSEMBLY

FIELD OF THE INVENTION

The present invention relates to a car lighter plug of quick disassembly and, more particularly, to a car lighter plug capable of being inserted into a car lighter insertion hole to transmit electricity to a lighter, a charger, or an electronic device connected to the car lighter plug. The car lighter plug of quick disassembly of the present invention can be firmly fixed after angle adjustment is finished.

BACKGROUND OF THE INVENTION

A conventional car lighter plug has an insertion portion, which has an elastic conducting post disposed at the front end thereof. Projective elastic conducting sheets are disposed at the side face of the insertion portion. The insertion portion can be inserted into a car lighter insertion hole to let the elastic conducting post and the elastic conducting sheets of the insertion portion achieve electric connection with corresponding conducting terminals in the car lighter insertion hole so that electricity can be transferred to the car lighter plug. The car lighter plug can also be connected to a lighter, a charger, or an electronic device so that electricity can be transferred to the lighter, the charger, or the electronic device.

Besides, there is also a kind of car lighter plug with an angle-adjustable joint structure thereon. A user can adjust various kinds of a car lighter, a charger, or an electronic device according to practical necessity to facilitate use.

However, the joint structure of the conventional car lighter plug utilizes a ratchet wheel or a friction face to fix the already adjusted angle. After a period time of use, the situation of slide may arise due to factors like abrasion so that the already adjusted angle cannot be firmly fixed.

Accordingly, the above conventional car lighter plug has inconvenience and drawbacks in practical use. The present invention aims to resolve the problems in the prior art.

SUMMARY OF THE INVENTION

The primary object of the present invention is to provide a car lighter plug of quick disassembly, whereby a first body and a second body thereof cannot make relative motion after angle adjustment is finished, thereby ensuring that the first body and the second body can be firmly fixed so as to have skidproof effect after angle adjustment is finished.

To achieve the above object, the present invention provides a car lighter plug of quick disassembly, which comprises a first body, a second body, a pivot, and a first quick-disassembly twist button. The first body has an elastic conducting post and a plurality of projective elastic conducting sheets. The rear end of the first body has a through hole. A plurality of elastic sheet portions, each having a positioning body, are formed in the through hole. The periphery of the elastic sheet portions has a vacant space. The front end of the second body has a second pivotal seat. The pivot has a pivotal portion, a ring of positioning teeth, and a stop ring. The pivotal portion of the pivot passes through the through hole of the first body and the second pivotal seat of the second body. One end of the first quick-disassembly twist button has a cam portion. The first quick-disassembly twist button is pivotally connected at one end of the pivot. The cam portion abuts against the first body. The positioning teeth engage the positioning bodies. The first quick-disassembly twist button can jointly drive the pivot to make axial displacement so that the stop ring can selectively enter into or recede from the vacant space.

The various objects and advantages of the present invention will be more readily understood from the following detailed description when read in conjunction with the appended drawing, in which:

DETAILED DESCRIPTION OF THE PREFERRED EMBODIMENTS

Figure 1:
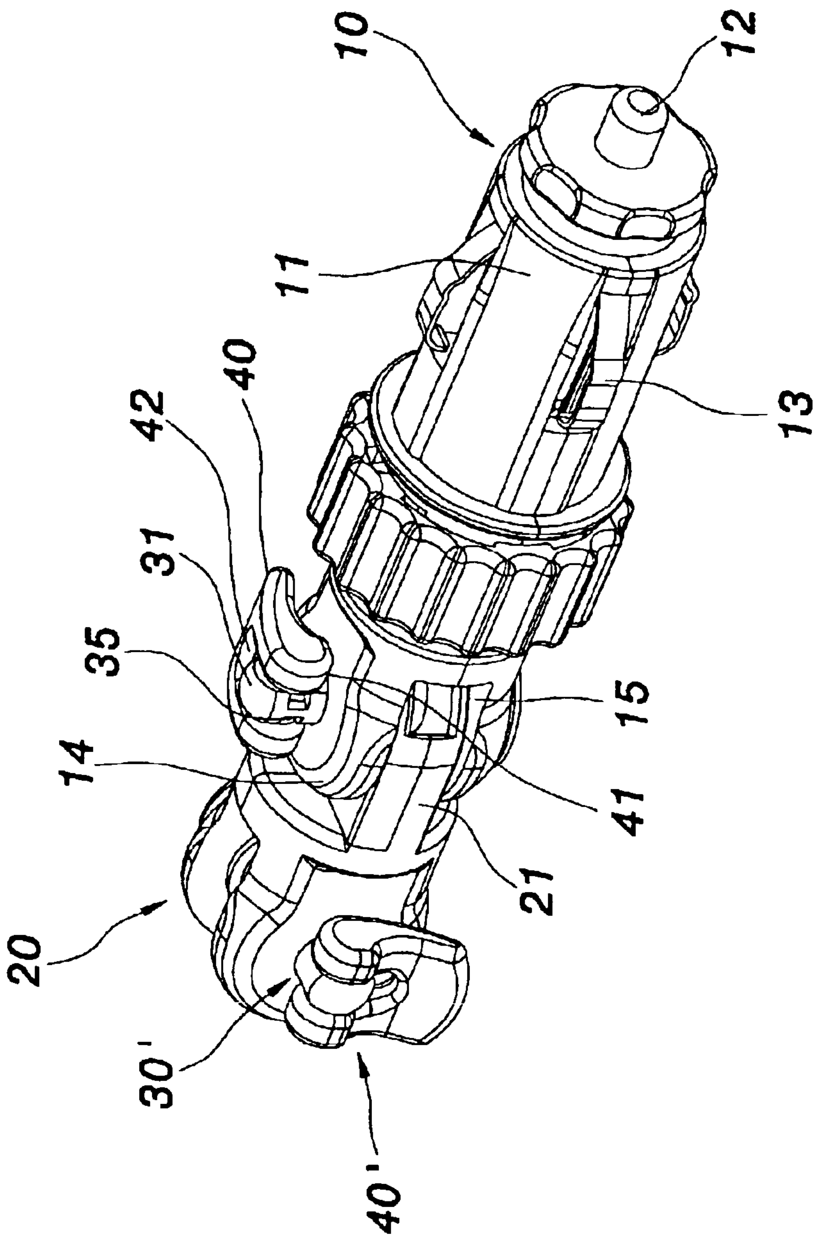
FIG. 1 is a perspective view of the present invention.
Figure 2:
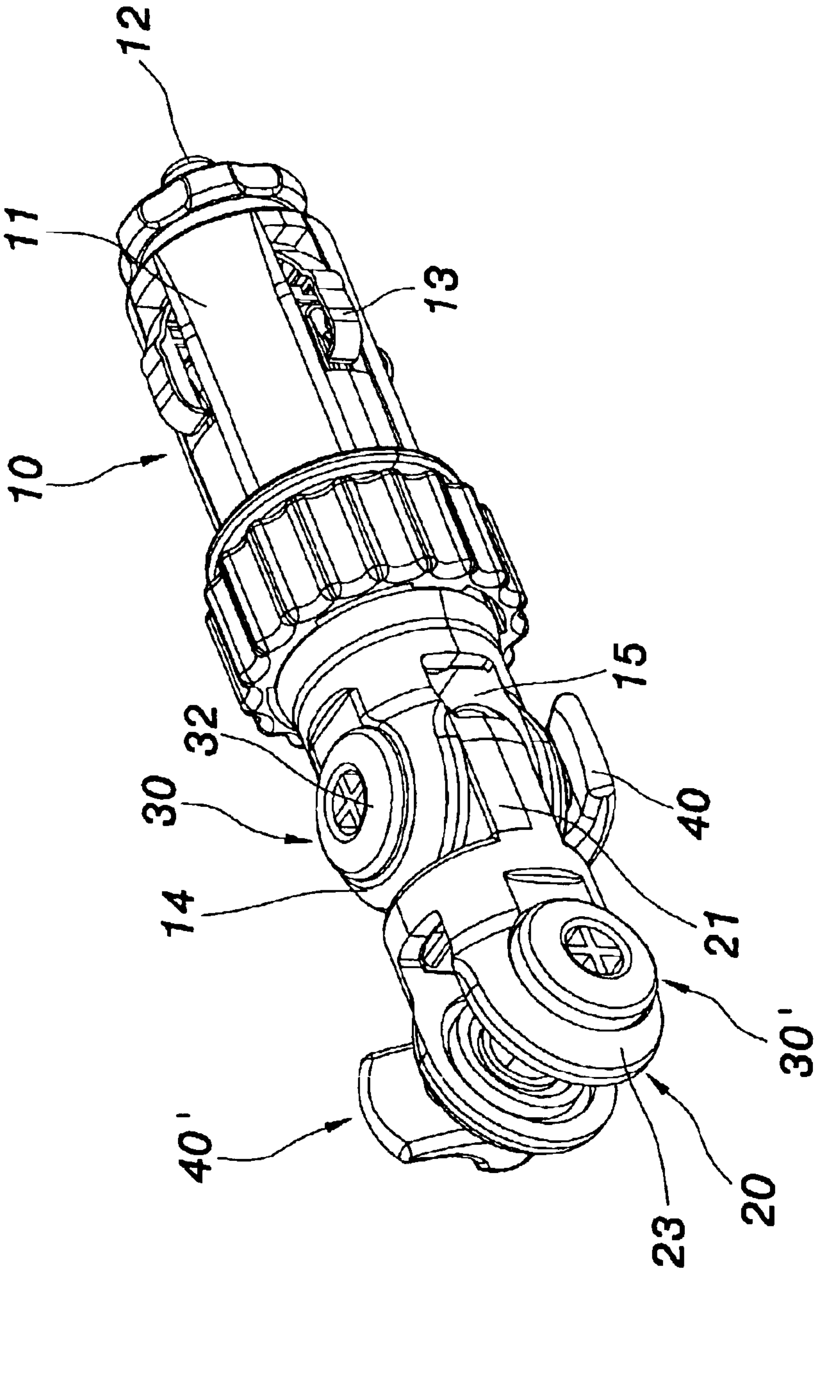
FIG. 2 is another perspective view of the present invention.
Figure 3:
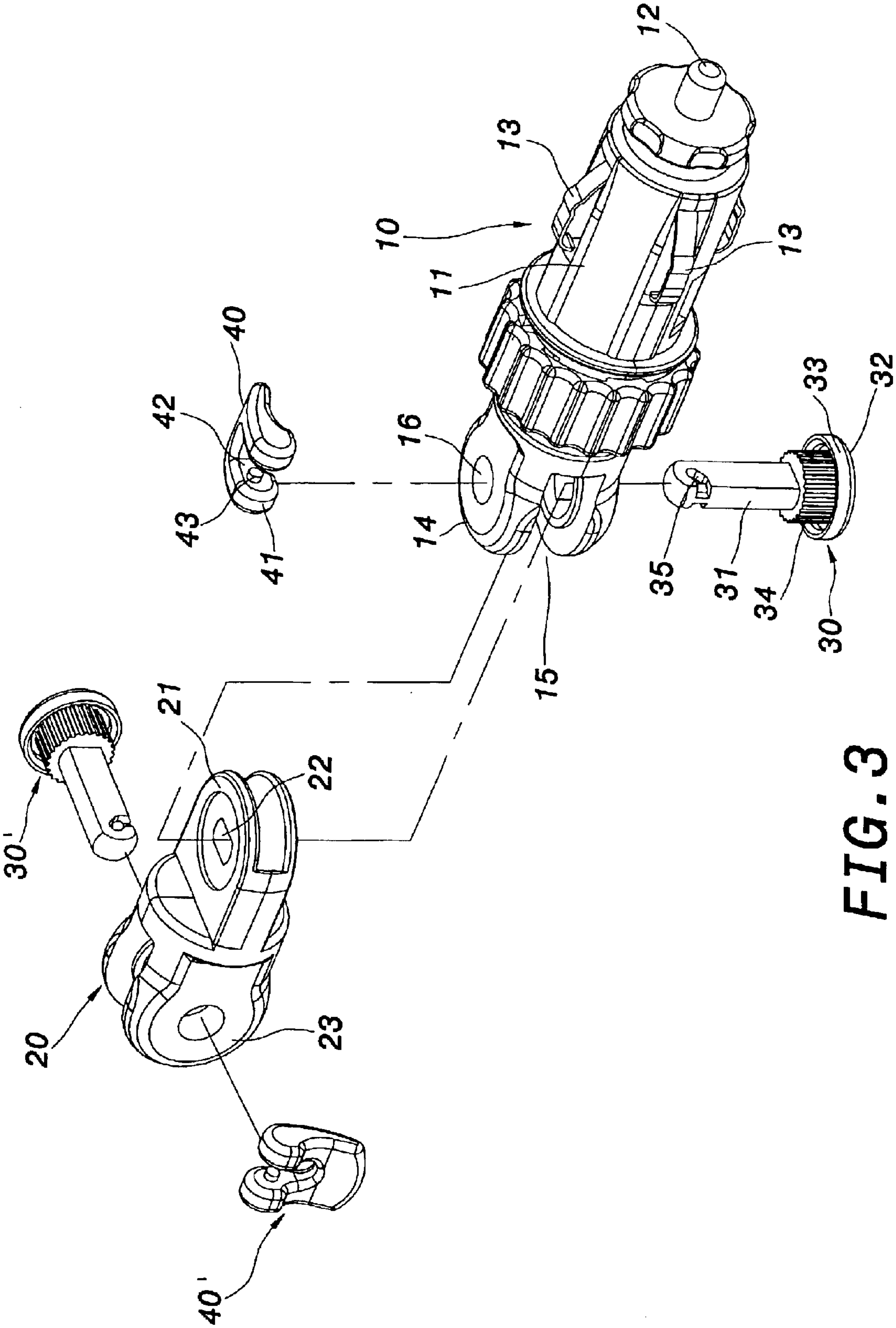
FIG. 3 is an exploded perspective view of the present invention.
Figure 4:
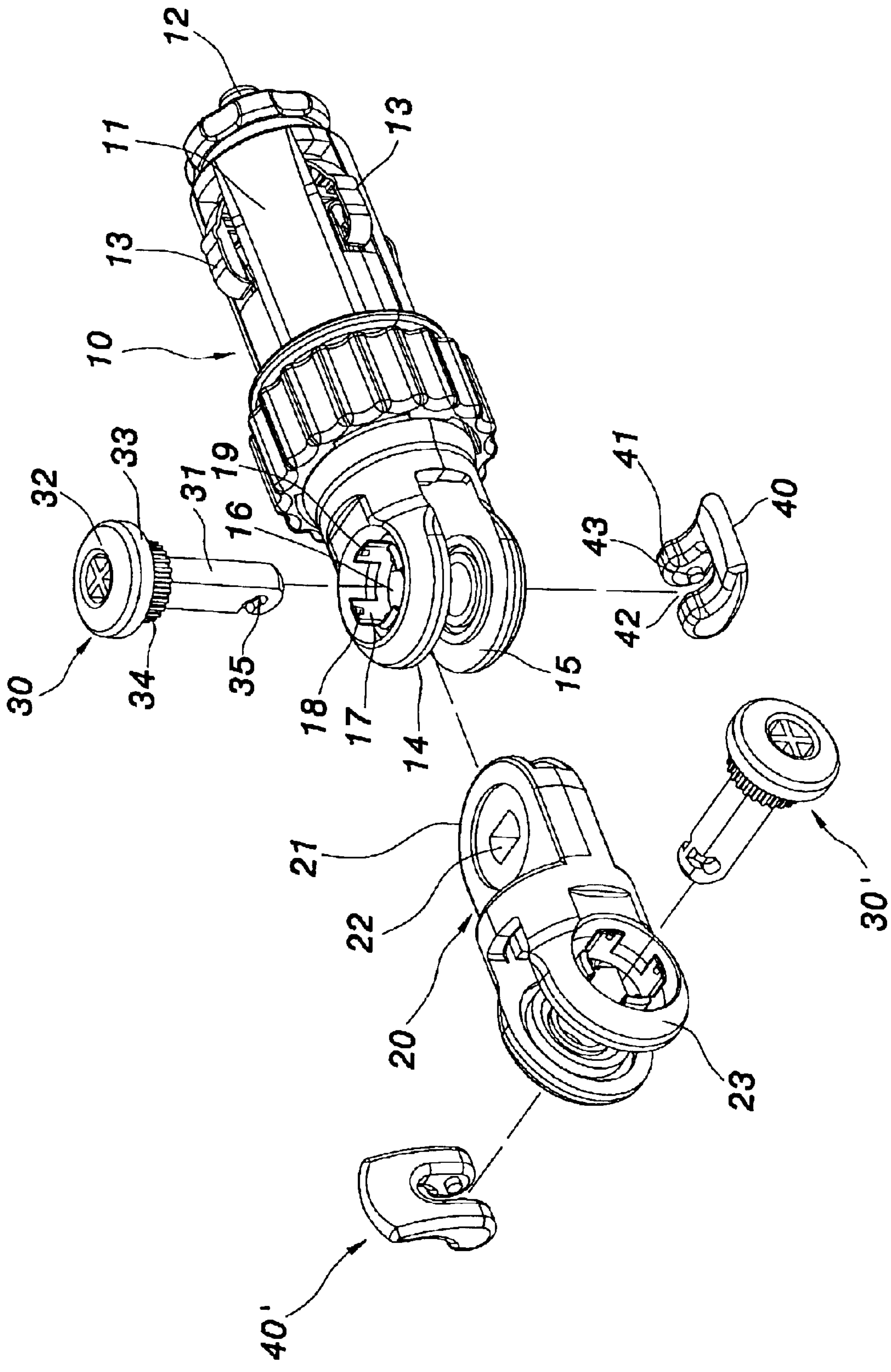
FIG. 4 is another exploded perspective view of the present invention.

As shown in FIGS. 1 to 4, the present invention provides a car lighter plug of quick disassembly, which comprises a first body 10, a second body 20, a pivot 30, and a first quick-disassembly twist button 40. The first body 10 has a cylindrical insertion portion 11, whose outer diameter is equal to the inner diameter of a car lighter insertion hole (not shown). The front end of the insertion portion 11 has an elastic conducting post 12. A plurality of projective elastic conducting sheets 13 are formed on the side face of the insertion portion 11. The elastic conducting post 12 and the elastic conducting sheets 13 are electrically connected to a car lighter, a charger, or an electronic device to be connected with the car lighter plug via conducting wires (not shown). The insertion portion 11 can be inserted into the car lighter insertion hole. The elastic conducting post 12 and the elastic conducting sheets 13 of the insertion portion 11 achieve electric connection with corresponding conducting terminals in the car lighter insertion hole so that electricity can be transferred to the car lighter plug.

The rear end of the first body 10 has a first pivotal seat 14, which has a groove 15 at the center thereof. The first pivotal seat 14 has a transversal through hole 16, which vertical intersects the groove 15. The through hole 16 has a plurality of elastic sheet portions 17 therein. Each of the elastic sheet portions 17 has a positioning body 18. The periphery of the elastic sheet portions 17 forms a vacant space 19 so that the elastic sheet portions 17 can make outward swing.

The front end of the second body 20 has a second pivotal seat 21, which is a flat body corresponding to the groove 15. The second pivotal seat 21 can be inserted into the groove 15. The second pivotal seat 21 has a noncircular transversal fixing hole 22 corresponding to the through hole 16. The other end of the second body 20 can be connected to a car lighter, a charger, or an electronic device according to necessity.

The pivot 30 has a pivotal portion 31, which is a noncircular body corresponding to the fixing hole 22 of the second body 20. One end of the pivotal portion 31 has a head portion 33 having a larger outer diameter. The outer edge of the head portion 32 has a stop ring 33 corresponding to the vacant space 19 of the first body 10. The pivot 30 has also a ring of positioning teeth 34 between the pivotal portion 31 and the head portion 32. The other end of the pivotal portion has two connection holes 35.

The pivotal portion 31 of the pivot 30 passes through the through hole of the first body 10 and the fixing hole 22 of the second body 20. The pivotal portion 31 and the fixing hole 22 are connected in such a way that they cannot make relative rotation. The pivot 30 and the second body 20 thus cannot make relative rotation. Because the inner diameter of the through hole 16 is larger than the outer diameter of the pivotal portion 31, the pivotal portion 31 and the through hole 16 are connected in such a way that they can make relative rotation. The pivot 30 and the first body 10 thus can make relative rotation. Therefore, the first body 10 and the second body 20 can make relative rotation with the pivot 30 as the axis.

One end of the first quick-disassembly twist button 40 has a cam portion 41 and a recessed portion 42. Each side of the recessed portion 42 has a connection shaft 43. The two connection shafts 43 are pivotally matched with the two connection holes 35 of the pivot 30 so that the first quick-disassembly twist button 40 can be pivotally connected with the pivot 30. The cam portion 41 of the first quick-disassembly twist button 40 can abut against the outside of the first pivotal seat 14 of the first body 10. The positioning teeth 34 of the pivot 30 can engage the positioning bodies 18 on the elastic sheet portions 17. When the first body 10 and the second body 20 make relative rotation, multi-stage positioning effect can be accomplished.

The first quick-disassembly twist button 40 can be wrenched to jointly drive the pivot 30 to make axial displacement through cam action of the cam portion 41. The stop ring 33 of the pivot 30 can thus selectively enter into the vacant space 19 of the first body 10 or recede from the vacant space 19. The car lighter plug of quick disassembly of the present invention is thus formed.

The first body 10 and the second body 20 are pivotally connected together through the pivot 30 to form an angle-adjustable joint structure. A user can adjust different angles of a car lighter, a charger, or an electronic device tp facilitate use according to practical necessity.

Figure 5:
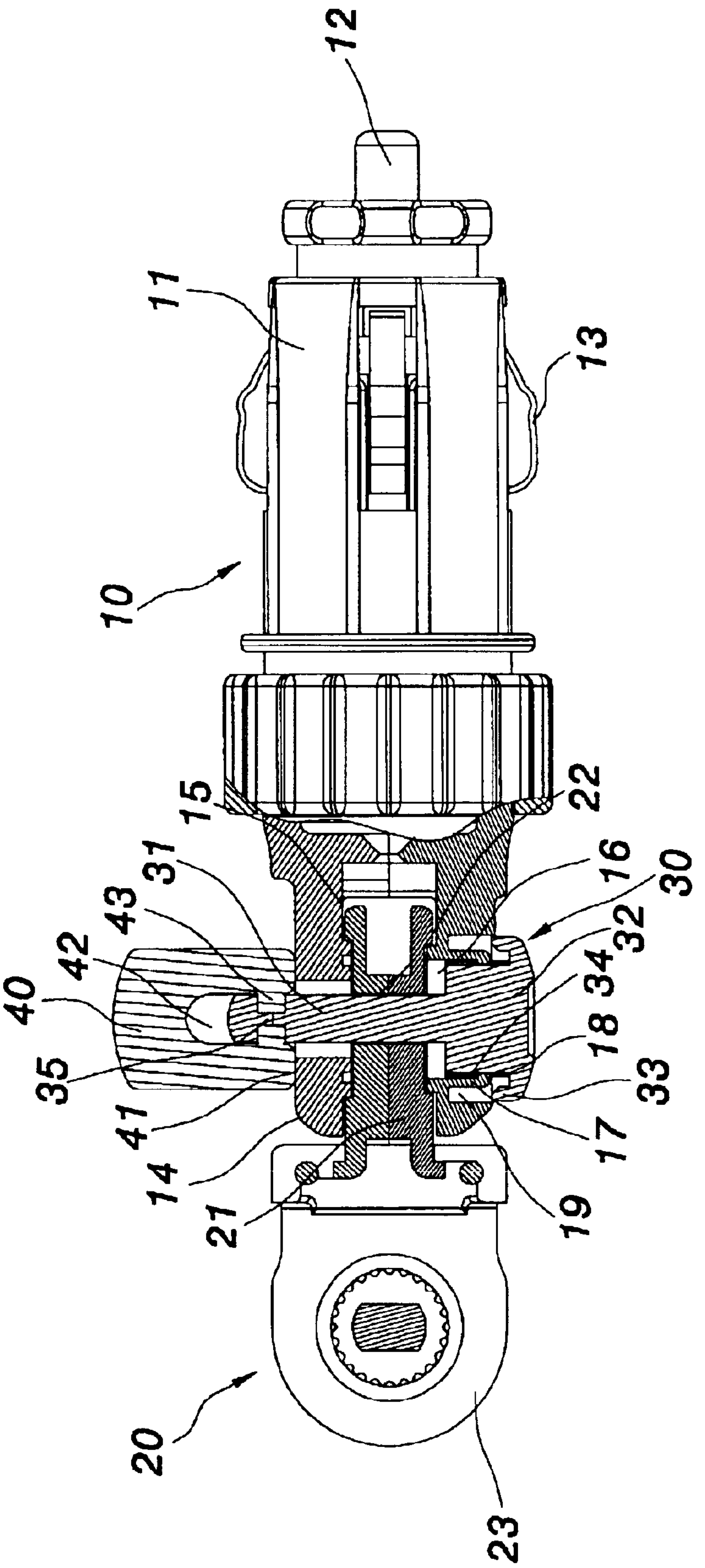
FIG. 5 is a cross-sectional view of the adjustment state of the present invention.

When the user wants to adjust the angle, he needs to first wrench the quick-disassembly twist button 40 so as to jointly drive the pivot 30 to make axial displacement through cam action of the cam portion 41. The stop ring 33 of the pivot 30 can thus recede from the vacant space 19, as shown in FIG. 5. The elastic sheet portions 17 can thus make outward swing and have elasticity so that the positioning teeth 34 of the pivot 30 and the positioning bodies 18 on the elastic sheet portions 17 can make relative motion. The first body 10 and the second body 20 can thus make relative rotation. Moreover, multi-stage positioning effect and sound can be generated through the action of the positioning teeth 34 and the positioning bodies 18.

Figure 6:
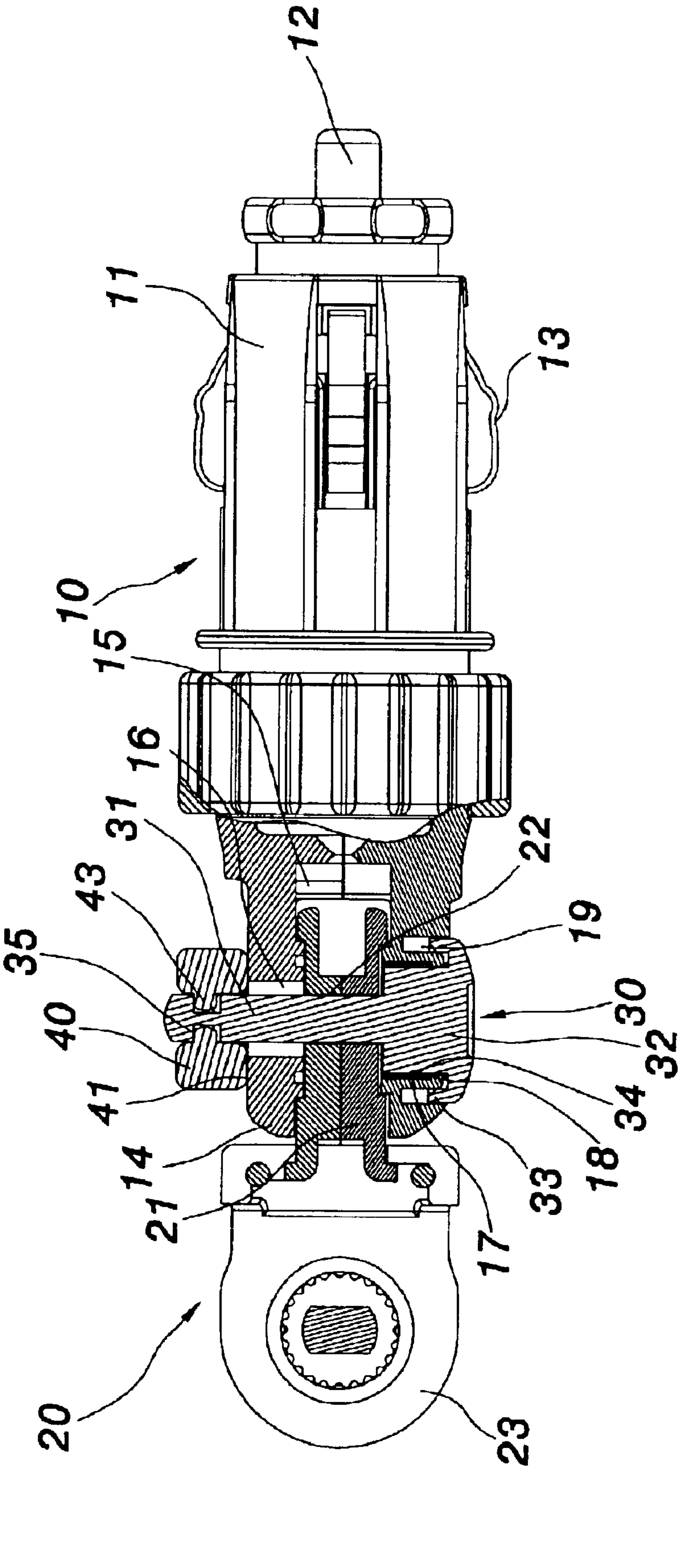
FIG. 6 is a cross-sectional view of the fixed state of the present invention.

After angle adjustment is finished, the user needs to wrench the first quick-disassembly twist button 40 in the reverse direction so as to jointly drive the pivot 30 to make axial displacement in the reverse direction through cam action of the cam portion 41. The stop ring 33 of the pivot 30 can thus enter into the vacant space 19, as shown in FIG. 6. The stop ring 33 of the pivot 30 can thus recede from the vacant space 19, as shown in FIG. 5. The elastic sheet portions 17 thus cannot make outward swing and have no elasticity so that the positioning teeth 34 of the pivot 30 and the positioning bodies 18 on the elastic sheet portions 17 cannot make relative motion. The first body 10 and the second body 20 thus cannot make relative rotation. Therefore, the first body 10 and the second body 20 can be firmly fixed after angle adjustment is finished to have skidproof effect.

Besides, the rear end of the second body 20 can also have a third pivotal seat 23, whose structure is the same as that of the first pivotal seat 14 of the first body 10. The third pivotal seat 23 of the second body 20 is also connected with a second pivot 30' and a second quick-disassembly twist button 40', which can be used to connect the car lighter, the charger, or the electronic device to form a dual-pivot car lighter plug, whose angle can be more flexible adjusted. The two pivots 30 and 30' are arranged in different directions, i.e., the pivot 30 is vertically arranged, while the pivot 30' is horizontally arranged.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A car lighter plug of quick disassembly comprising:

a first body having an elastic conducting post and a plurality of projective elastic conducting sheets, a rear end of said first body having a through hole, said through hole having a plurality of elastic sheet portions therein, each of said elastic sheet portions having a positioning body, the periphery of said elastic sheet portions having a vacant space;

a second body whose front end has a second pivotal seat;

a first pivot having a pivotal portion, a ring of positioning teeth, and a stop ring, said pivotal portion of said pivot passing through said through hole of said first body and said second pivotal seat of said second body; and a first quick-disassembly twist button whose one end has a cam portion, said first quick-disassembly twist button being pivotally connected at one end of said first pivot, said cam portion abutting against said first body, said positioning teeth engaging said positioning bodies, said first quick-disassembly twist button being capable of jointly driving said first pivot to make axial displacement so that said stop ring selectively enters into or recedes from said vacant space.

2. The car lighter plug of quick disassembly as claimed in claim 1, wherein said first body has an insertion portion, said elastic conducting post being disposed at a front end of said insertion portion, and said elastic conducting sheets being disposed on a side face of said insertion portion.

3. The car lighter plug of quick disassembly as claimed in claim 1, wherein a rear end of said first body has a first pivotal seat, said through hole being formed on said first pivotal seat of said first body, a groove being formed at the center of said first pivotal seat of said first body, said through hole intersecting said groove, and said second pivotal seat of said second body being inserted into said groove.

4. The car lighter plug of quick disassembly as claimed in claim 1, wherein said second pivotal seat of said second body has a fixing hole, and said pivotal portion of said first pivot passes through said fixing hole of said second body.

5. The car lighter plug of quick disassembly as claimed in claim 1, wherein one end of said pivotal portion of said first pivot has a head portion having a larger outer diameter, and said stop ring is disposed at an outer edge of said head portion.

6. The car lighter plug of quick disassembly as claimed in claim 1, wherein the other end of said pivotal portion of said first pivot has two connection holes, and one end of said first quick-disassembly twist button has a recessed portion, and each side of said recessed portion has a connection shaft, and said two connection shafts are pivotally connected with said two connection holes of said first pivot so that said first quick-disassembly twist button is pivotally connected with said first pivot.

7. The car lighter plug of quick disassembly as claimed in claim 1, wherein a rear end of said second body has a third pivotal seat, and said third pivotal seat at the rear end of said second body is connected with a second pivot and a second quick-disassembly twist button for connecting to a car lighter, a charger, or an electronic device so as to form a dual-pivot car lighter plug, said first pivot and the second pivot are arranged in different direction.

* * * * *